Nov. 15, 1938.  S. WADSTEN  2,136,649
COILED COIL AND THE METHOD AND APPARATUS FOR MAKING
Filed March 17, 1936
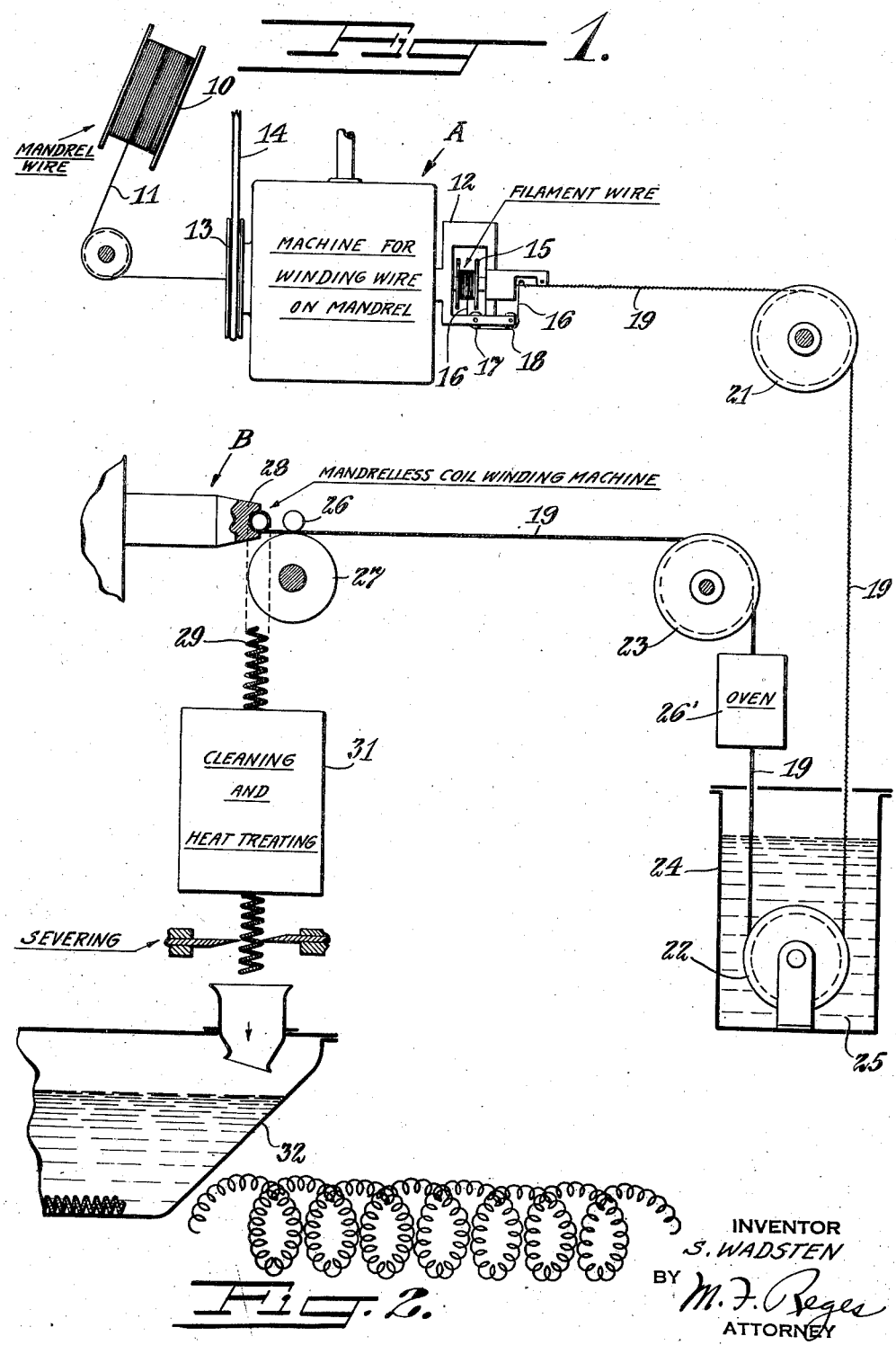

UNITED STATES PATENT OFFICE 2,136,649

COILED COIL AND THE METHOD AND APPARATUS FOR MAKING

Sten Wadsten, Bloomfield, N. J., assignor, by mesne assignments, to Westinghouse Electric and Manufacturing Company, East Pittsburgh, Pa., a corporation of Pennsylvania Application March 17, 1936, Serial No. 69,360

16 Claims. (Cl. 153—64)

This invention relates to a method and apparatus for the manufacture of coiled-coil filaments for incandescent electric lamps, or for other uses.

In the manufacture of incandescent electric lamps it has long been the practice to use helically coiled filaments, and recent developments in this field have brought about the use of what is termed a coiled-coil filament. A coiled-coil filament comprises a refractory wire, usually of tungsten, coiled to helical form to provide a primary coil; this primary coil is then wound to produce a secondary coil, the result being a small and large helix giving a greater amount of resistance wire in a relatively short length of filament.

Various methods have been proposed for making coiled coils. One method is to wind the primary coil on a mandrel in the usual way, then to wind the mandrel-wound coil on another mandrel to produce a secondary helical coil. Obviously, after the winding operations, it is necessary to heat the coil to set it and then place the coil in a solution which is inert with respect to the tungsten coil, but which dissolves out the mandrel.

Another method is to wind the primary coil without using a mandrel in the manner shown and described in Patent No. 1,795,767 to J. W. Ekstedt issued March 10, 1931 and to form the secondary coil also without using a mandrel, as shown and described in Patent No. 2,013,432 to R. H. Beebe, issued September 3, 1935.

In the first above mentioned patent, a wire is wound to helical form by endwise movements into what is termed a cavity die. The resultant product is a continuous helical mandrelless coil. This mandrelless coil is then subjected to the method set forth in the second above mentioned patent, and formed into a secondary helical coil, the resultant product being a mandrelless coiled-coil.

In accordance with the present invention the method of helically winding a coil on a mandrel is utilized in conjunction with the mandrelless method of winding, as set forth in the first mentioned patent, employed to wind the mandrel-wound helical coil into a secondary helical coil and it is an object of the present invention to provide a method of winding a primary helical coil into a secondary coil without the aid of a mandrel.

Another object of the invention is to provide a method of coiling a mandrel-wound helically coiled length of wire into a secondary helix.

A further object of the invention is to prepare a helically coiled length of wire for a winding operation.

A still further object of the invention is to produce a secondary helical coil by directing a primary helical coil into a cavity die.

Other objects and advantages of the invention will be more clearly understood by reference to the following description together with the accompanying drawing in which:

Fig. 1 is a diagrammatic view of a coil-winding head for helically winding a filament wire on a mandrel, and for winding the mandrel-wound coil into a secondary helical coil by means of a mandrelless coil-winding die; and Fig. 2 shows a section of a completed coiled-coil.

The present invention may be practiced by preparing the first or primary helical coil by winding a wire on a mandrel in the usual manner. This coil may then be prepared for the secondary winding by filling the turns between the coil with a material sufficiently solid to give the coil sufficient body or temporary solidity to enable it to be moved into a cavity die for a coil-winding operation to produce a secondary coil.

The mandrel on which the primary coil is wound is a molybdenum, and is dissolved away when the coil is immersed in an acid inert with respect to the tugnsten filament, but which disintegrates the mandrel.

As above mentioned the primary coil is prepared for a coiling operation by having the spaces between the turns filled with a solid material, and good results have been obtained by using borax. The borax may be in solution and the coil may be passed through the solution to permit the material to fill the spaces between the turns. After the primary coil has been prepared and wound to produce a secondary coil, it may be placed in a bath of a solvent to remove the filling material.

The present invention may be practiced by utilizing any standard coil-winding mechanism A for winding a filament wire on a mandrel and a mandrelless coil-winding mechanism B for winding the mandrel-wound coil into a secondary helical coil.

The mechanism A may include a spool 10 for mandrel wire 11 which is usually molybdenum. This mandrel wire is drawn through a winding head 12 driven by a pulley 13 by means of a belt 14 leading to a motor pulley (not shown). The coil-winding head includes a spool 15 for filament wire 16 which is usually of tungsten. This filament wire is led over pulleys 17 and 18, and, as the head 12 rotates, the filament wire is wound around the mandrel wire to produce a mandrel-wound coil 19. This coil is led over guide pulleys 21, 22, and 23. The guide pulley 22 is disposed in a tank or container 24, having therein a solution 25, for example, a saturated solution of borax, containing a finely divided material, such as an excess of borax, in suspension, and as the coil passes through the solution the spaces between the turns of the coil are filled with solid material.

Although borax has been found to give satisfactory results, it is to be understood that any other suitable material may be used, the purpose being to fill the spaces between the turns of the coil.

When a coil is prepared by having the spaces between the turns filled, the coil takes the form of a solid or cylindrical rod, and when the second coiling operation is performed, the separating material holds the turns in their required space relation, causing them to stretch and to hold their helical shape at the required pitch until set by heat, or in certain cases without heat, after which the separating material is removed. Any material, therefore, that will serve to keep the turns in their separated relation during a coil-winding operation, is contemplated.

The present invention provides means in the form of a cavity die for producing the secondary coil, but it is to be understood that in some cases it may be desirable to produce a secondary coil by winding on another mandrel and such operation is also contemplated and within the scope of the present invention.

After the coil has passed through the solution 25, it passes through an oven 26' which bakes the material into a solid form. The coil is then similar to a solid wire and is led between force rollers 26 and 27 which thrust the prepared mandrel-wound wire into a cavity die 28. The wire issues from this die in the form of a secondary coil 29, passes through a cleaning bath 31 to remove the material from between the turns, and is heat-treated at a temperature sufficient to set the turns of the coil or coils. As the coiled-coil passes from the heat-treating and cleaning station, it may be cut into sections of proper lengths and sections deposited to a tank 32 containing a bath of sufficient strength to dissolve out the mandrel. This mandrel-removing method is well-known and is practiced in the art at the present time to remove mandrels from sections of mandrel-wound filaments.

Whereas heretofore one method of making coiled-coils was to first wind a filament wire on a mandrel and thus wind the mandrel-wound wire on another mandrel, the present invention makes it possible to eliminate the use of the second mandrel, thus simplifying the process of manufacture.

Furthermore, in cases where the secondary coil was produced by winding a primary coil on a mandrel, it was necessary to hold the primary coil under tension during the second winding operation which resulted in internal stresses and in some cases damaged the wire. The present invention avoids any excessive stress in the winding of the secondary coil since the prepared wire is thrust into the cavity die, and a compressive force is applied.

Although a preferred embodiment of the invention is shown and described herein, it is to be understood that the steps of the method may be varied and modifications may be made in the apparatus without departing from the spirit and scope of the invention as set forth in the appended claims.

What is claimed:

1. The method of making a coiled-coil filament from a wire, which comprises first winding the wire about a mandrel to produce a mandrel-wound primary coil, depositing solid material between the turns of said wire, and moving said primary coil into a cavity die to produce a secondary coil.

2. The method of making a coiled-coil filament from a wire which comprises helically coiling a filament wire to provide a primary coil, re-enforcing the primary coil to condition it for a second coil-winding operation, and in moving said primary coil endwise into a cavity die to produce a secondary coil.

3. The method of winding a wire to produce a coiled-coil which comprises producing a primary helical coil with a filler between the turns, and moving said primary coil into a cavity die to produce a helical secondary coil.

4. The method of making a coiled-coil filament from a wire, which comprises passing a helically-coiled wire through a solution containing finely divided material until the space between the turns of the coil fill with said material, heating to dehydrate the material, moving the coil endwise into a cavity die to produce a secondary coil, and removing said material.

5. The method of making a coiled-coil filament from a wire which comprises passing a mandrel-wound helically coiled wire through a solution containing finely divided material until the space between the turns of the coil fill with said material, heating to dehydrate the material, and dissolving said material.

6. The method of winding a wire to produce a coiled-coil which comprises helically winding a wire on a mandrel, filling the spaces between the turns of the helix with solid material, and helically coiling said mandrel-wound wire.

7. An apparatus for making a coiled-coil filament comprising a mandrel, means for winding a filament wire about said mandrel to produce a mandrel-wound primary coil, means for depositing solid material between the turns of said wire, a cavity die, and means for moving the primary coil endwise into said die to produce a secondary coil.

8. An apparatus for making a coiled-coil filament comprising a mandrel, means for moving said mandrel, means for helically winding a wire about said mandrel, a container, a solution containing finely divided material in said container, means for moving said mandrel-wound coil through said solution to fill the spaces between the turns of said coil with particles of said material, and means for winding said coil into a secondary helical coil.

9. An apparatus for making a coiled-coil filament comprising a mandrel, means for moving said mandrel, means for helically winding a wire about said mandrel, a container, a solution containing finely divided material in said container, means for moving said mandrel-wound coil through said solution to fill the spaces between the turns of said coil with particles of said material, a cavity die, and means for moving said coil into said die to produce a secondary helical coil.

10. An apparatus for making a coiled-coil filament comprising a mandrel, means for moving said mandrel, means for helically winding a wire about said mandrel, a container, a solution containing finely divided material in said container, means for moving said mandrel-wound coil through said solution to fill the spaces between the turns of said coil with particles of said material, means for winding said coil into a secondary helical coil, and means for removing said material from between said turns.

11. An apparatus for making a coiled-coil filament comprising a mandrel, means for moving said mandrel, means for helically winding a wire about said mandrel, a container, a solution containing finely divided material in said container, means for moving said mandrel-wound coil through said solution to fill the spaces between the turns of said coil with particles of said material, a cavity die, means for moving said coil into said die to produce a secondary helical coil, and means for removing said material from between said turns.

12. The method of winding a wire to produce a coiled coil filament comprising forming a wire into a primary coil reinforced by solid material disposed between the turns thereof, and winding said primary coil into a secondary coil.

13. Apparatus for making a coiled coil filament comprising means for producing a primary coil reinforced by solid material disposed between the turns thereof, and means for winding said coil into a secondary coil.

14. A coil filament formed of refractory metal wire reinforced by solid water-soluble material between its turns.

15. A coil filament formed of refractory metal wire reinforced by solid water-soluble material between its turns and wound into a secondary coil.

16. A mandrel with a filament formed of refractory metal wire helically wound thereon with solid water-soluble reinforcing material disposed between the turns of said wire.

STEN WADSTEN.